United States Patent [19]

King

[11] 4,069,612
[45] Jan. 24, 1978

[54] ANIMAL SNARE ASSEMBLY

[76] Inventor: Lawrence Edward King, General Delivery, Clarkleigh, Canada, R0C 0R0

[21] Appl. No.: 716,426

[22] Filed: Aug. 23, 1976

[51] Int. Cl.² .......................................... A01M 23/34
[52] U.S. Cl. ..................................................... 43/87
[58] Field of Search ..................................... 43/87, 15

[56] References Cited

U.S. PATENT DOCUMENTS 3,958,360  5/1976  King .......................................... 43/87

FOREIGN PATENT DOCUMENTS 318,478  9/1929  United Kingdom ..................... 43/87

*Primary Examiner*—Warner H. Camp
*Attorney, Agent, or Firm*—Stanley G. Ade

[57] ABSTRACT

A pair of arms are pivoted together by one end thereof and normally urged apart by a heavy-duty spring. A flexible snare consists of a snare loop and a free or standing end passing through a ring on one end of the snare in a form of a running noose. The free end passes through an eye of the other end of one of the arms and is secured to a trigger lever pivotally mounted on the other end of the other arm. A trigger loop is pivoted to the one arm and in one position holds the trigger lever with the trap in the set position and engages the other arm with the trap in the locked position. When in the set position, a pull on the noose displaces the trigger lever slightly so that the spring pressure between the two arms springs the trap and tightens the noose.

13 Claims, 5 Drawing Figures

ANIMAL SNARE ASSEMBLY

BACKGROUND OF THE INVENTION

This invention relates to new and useful improvements in snare type trap assemblies.

Normally such assemblies are difficult to set because of the heavy springs involved and do not incorporate means for readily locking the trap when attempting to set the trigger or when storing and transporting same.

Another disadvantage is the bulky configuration of said traps making it difficult to hide same when they are set and making it difficult to store and transport same when not in use.

SUMMARY OF THE INVENTION

The present invention overcomes these disadvantages by providing a relative simple trap comprising a pair of arms pivoted together by one end thereof and having a heavy-duty spring normally urging them apart. A running noose type snare is engaged with the upper ends of the two arms and the trigger assembly enables the trap to be set readily and easily. The trigger assembly incorporates a member which, in one position, sets the trigger and, in the other position, locks the trap against the inadvertent displacement.

The principle object and essence of the invention is therefore to provide a snare type trap which is easily set yet which is sprung readily and easily by a slight pull on the snare noose.

Another object of the invention is to provide a device of the character herewithin described which is easily locked against displacement for transporation and storage purposes thus making it relatively easy to store these traps in a relatively small space.

Still another object of the invention is to provide a device of the character herewithin described which is extremely simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangment and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 2:
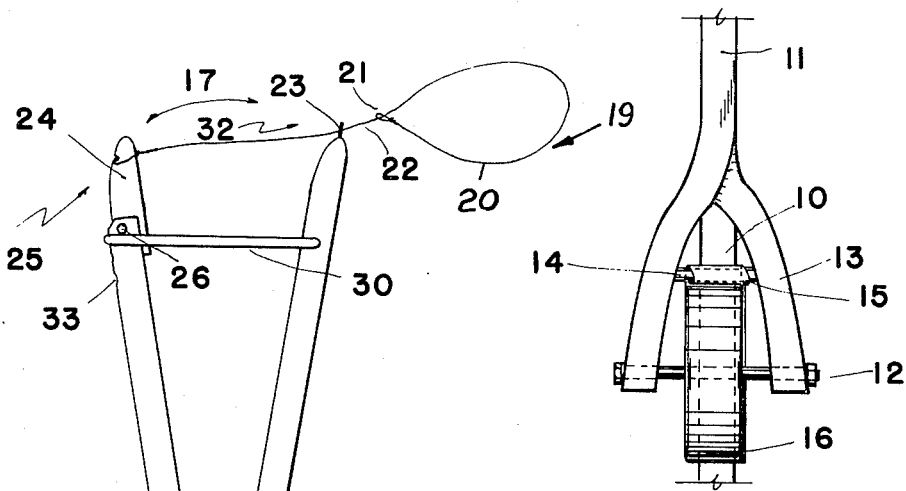
FIG. 2 is a fragmentary partially isometric view of the lower end of the two arms forming the trap.

Proceeding therefore to describe the invention in detail, reference character 10 illustrates a first elongated member and reference character 11, a second elongated member.

These members are made preferably from flat bar stock or the like and are pivoted together by one end thereof by means of pivot pin 12.

The lower end 13 of one of the members is bifurcated as shown in FIG. 2 and is provided with a cross pin 14 around which one end 15 of a heavy-duty flat coil spring 16, is engaged.

Figure 1:
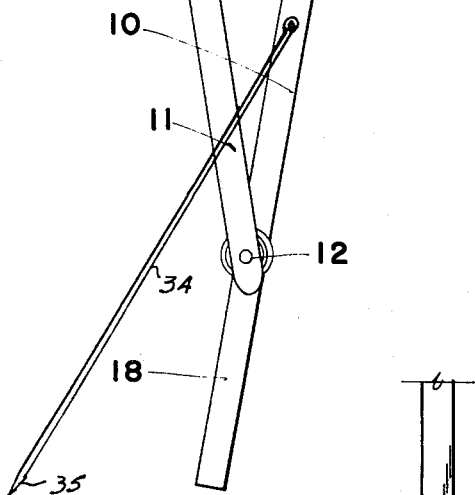
FIG. 1 is a side elevation of the trap in the set position.
Figure 3:
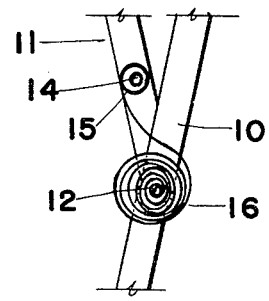
FIG. 3 is a fragmentary sectional view of FIG. 2.
Figure 4:
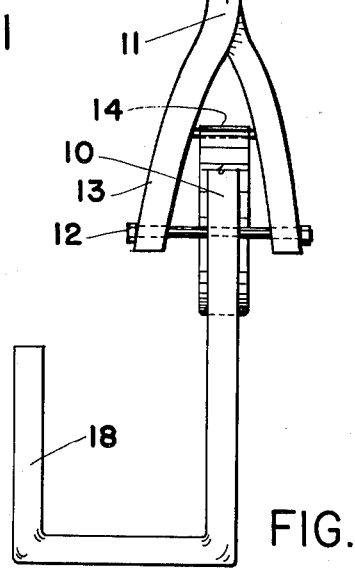
FIG. 4 is a fragmentary end elevation of the junction between adjacent arms showing the stop means limiting the movement of the two arms relative to one another.

The flat coil spring 16 is wound around the pivot pin 12 and is secured to the lower end of the other member 10 so that when in the position shown in FIG. 1, this heavy-duty flat coil spring is normally urging the members apart in the direction of doubled headed arrow 17.

When the members are moved apart by spring 16, it is desirable that the degree of movement be limited to approximately 180° and in this connection, one of the members 10, extends beyond the point of pivotal connection 12 in the form of a U-shaped stop 18 against which the member 11 engages for this purpose.

A loop type snare assembly collectively designated 19 consists of a flexible snare loop 20 one end of which passes through a ring 21 in a form of a running noose and extends as a standing part 22.

A guide in the form of a ring 23 is secured adjacent the upper end of the first member 10 and the standing part 22 extends freely through this guide and is secured adjacent the upper end of a trigger lever 24 forming part of a trigger assembly collectively designated 25.

Figure 5:
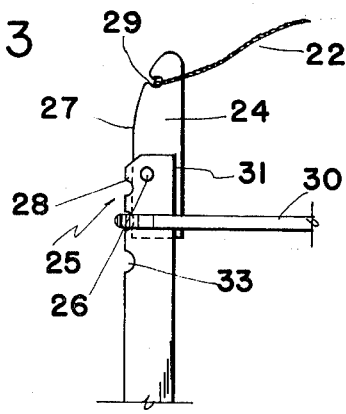
FIG. 5 is an enlarged fragmentary view of the trigger mechanism per se.

This trigger assembly includes the aforementioned lever 24 which is pivoted to adjacent the upper end of the member 11 by means of pivot pin 26 and this lever is in the form of a flat strip having an outer edge 27 which includes a straight inner portion 28 and a curved outer portion 29 as clearly shown in FIG. 5 and it will be observed that the standing part 22 of the snare wire is connected to adjacent the outer end of the curved portion 29 as clearly illustrated.

The other portion of the trigger assembly takes the form of a setting and locking lever or member 30. In this embodiment, this member 30 takes the form of a wire bale pivoted by one end thereof to adjacent the upper end of the first member 10 and engaging over the lever 24 and the upper end of the second member 11.

When in the set position illustrated in FIGS. 1 and 5, this bale member engages the lever 24 adjacent the junction of the straight portion 28 and the curved portion 29, outboard of the pivot pin 26 but inboard of the extreme upper end 31 of the second member 11. As mentioned previously, the spring 16 maintains pressure of the trigger assembly when in the set position illustrated and it will be appreciated that the slightest movement of the snare assembly will pivot the lever 24 in the direction of arrow 32 thus enabling the bale 30 to pass over center so that the lever 24 tips and the trap is sprung. This means that the two arms move apart due to the spring 16 tightening the snare around the animal's neck which has disturbed the snare assembly.

As mentioned previously the extension of the arms or members 10 and 11 is limited by the U-shaped stop 18.

During setting and during storage and transportation of the trap, the bale or member 30 is engaged over the end 31 of the second member 11 and moved downwardly beyond the trigger lever 24 so that it engages within a notch 33 formed on the outer edge of the second member 11 whereupon it acts as a locking mechanism and prevents the trap from being sprung. It also facilitates the setting of the trap and the positioning of the trigger lever 24 so that when the trigger lever is in the desired position, the bale 30 can be moved upwardly to the position shown in FIG. 1, it being understood that the two arms are squeezed together by the operator to overcome the pressure of spring 16 during this setting function.

Finally note should be taken of a pivoted support member 34 which is pivoted by one end thereof to the first member 10 and extends downwardly and terminates in the pointed end 35.

This is positioned so that the end 35 engages the ground and assists in maintaining the trap in the upright, set position illustrated in FIG. 1.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A snare type trap, said trap having a locked position, a set position, and a sprung position, said trap comprising in combination a first elongated member, a second elongated member pivotally secured by one end thereof to one end of said first elongated member in a substantially V-shaped formation when in said set position and in said locked position, spring means reacting between said first and second members normally urging the upper ends thereof apart from one another, a flexible snare wire assembly having a running noose formed therein and a standing part extending therefrom, guide means on the other end of said first member, said standing part freely extending through said guide means, and a trigger assembly on the other end of said second member, said standing part being operatively connected to said trigger assembly, said trigger assembly including a lever pivoted by adjacent one end thereof to adjacent the other end of said second member and a setting and locking member pivotally secured by one end thereof to adjacent the other end of said first member and engaging around said second member and said lever when said trap is in the set position and around said second member only when said trap is in the locked position.

2. The trap according to claim 1 in which said setting and locking member is in the form of an elongated member pivotally secured by said one end thereof to said first member and engaging around said lever above the pivotal connection of said first member with said second member but below the other end of said second member when in the set position, said lever comprising a flat strip having an outer edge including a straight inner portion and a curved outer portion, said elongated setting and locking member engaging said lever adjacent the junction of said straight inner portion and said curved outer portion.

3. The trap according to claim 2 which includes notch means in said second member inboard of said other end, said elongated setting and locking member engaging said notch means when said trap is in the locked position.

4. The trap according to claim 3 in which one of said first and second members extends beyond the pivotal securement of the other of said first and second members thereto thereby forming a stop component in a U-shaped configuration whereby said other member engages said stop component and limits the extension of said first and second members when said trap is in the sprung position.

5. The trap according to claim 2 in which one of said first and second members extends beyond the pivotal securement of the other of said first and second members thereto thereby forming a stop component in a U-shaped configuration whereby said other member engages said stop component and limits the extension of said first and second members when said trap is in the sprung position.

6. A trigger assembly for traps which include a first member and a second member pivotally secured together by one end thereof and having a flexible snare wire assembly and spring means reacting between said first and second members normally urging same apart; said trigger assembly comprising in combination a lever pivoted by adjacent one end thereof to adjacent the other end of said second member and a setting and locking member pivotally secured by one end thereof to adjacent the other end of said first member and engaging around said second member and said lever when said trap is in the set position and around said second member only when said trap is in the locking position.

7. The trigger assembly according to claim 6 in which said setting and locking member is in the form of an elongated member pivotally secured by said one end thereof to said first member and engaging around said lever above the pivotal connection of said first member with said second member but below the other end of said second member when in said set position, said lever comprising a flat strip having an outer edge including a straight inner portion and a curved outer portion, said elongated setting and locking member engaging said lever adjacent the junction of said straight inner portion and said curved outer portion.

8. The trigger assembly according to claim 7 which includes notch means in said second member inboard of said other end, said elongated setting and locking member engaging said notch means when said trap is in the locked position.

9. A snare type trap, said trap having a locked position, a set position, and a sprung position, said trap comprising in combination a first elongated member, a second elongated member pivotally secured by one end thereof to one end of said first elongated member in a substantially V-shaped formation when in said set position and in said locked position, spring means reacting between said first and second members normally urging the upper ends thereof apart from one another, a flexible snare wire assembly having a running noose formed therein and a standing part extending therefrom, guide means on the other end of said first member, said standing part freely extending through said guide means, and a trigger assembly on the other end of said second member, said standing part being operatively connected to said trigger assembly, one of said first and second members extending beyond the pivotal securement of the other of said first and second members thereto thereby forming a stop component in a U-shaped configuration whereby said other member engages said stop component and limits the extension of said first and second members when said trap is in the sprung position.

10. The trap according to claim 9 in which said trigger assembly includes a lever pivoted by adjacent one end thereof to adjacent the other end of said second member and a setting and locking member pivotally secured by one end thereof to adjacent the other end of said first member and engaging around said second member and said lever when said trap is in the set position and around said second member only when said trap is in the locked position.

11. The trap according to claim 10 in which said setting and locking member is in the form of an elongated member pivotally secured by said one end thereof to said first member and engaging around said lever above the pivotal connection of said first member with said second member but below the other end of said second member when in the set position, said lever comprising a flat strip having an outer edge including a straight inner portion and a curved outer portion, said elongated setting and locking member engaging said lever adjacent the junction of said straight inner portion and said curved outer portion.

12. The trap according to claim 11 which includes notch means in said second member inboard of said other end, said elongated setting and locking member engaging said notch means when said trap is in the locked position.

13. The trap according to claim 1 in which one of said first and second members extends beyond the pivotal securement of the other of said first and second members thereto thereby forming s stop component in a U-shaped configuration whereby said other member engages said stop component and limits the extension of said first and second members when said trap is in the sprung position.

* * * * *